(12) United States Patent
Chun

(10) Patent No.: US 7,676,933 B2
(45) Date of Patent: Mar. 16, 2010

(54) SPATULA AND BLADE

(75) Inventor: Sang Chun, Alpharetta, GA (US)

(73) Assignee: Restaurant Technology, Inc., Oak Brook, IL (US)

( * ) Notice: Subject to any disclaimer, the term of this patent is extended or adjusted under 35 U.S.C. 154(b) by 0 days.

(21) Appl. No.: 11/413,235

(22) Filed: Apr. 28, 2006

(65) Prior Publication Data

US 2007/0251099 A1    Nov. 1, 2007

(51) Int. Cl.
B26B 3/00 (2006.01)
B26B 1/00 (2006.01)
(52) U.S. Cl. .............................. 30/169; 30/335; 30/336; 30/337; 30/338
(58) Field of Classification Search .................. 30/171, 30/123, 334–339, 322, 330, 325, 327, 136, 30/151, 167–169, 272.1, 389, 351; D7/682–696; 16/111 R; 403/329; 172/272; 37/232, 468
See application file for complete search history.

(56) References Cited

U.S. PATENT DOCUMENTS

| | | | |
|---|---|---|---|
| 1,364,332 A | | 1/1921 | Verstraete |
| 1,591,047 A | * | 7/1926 | Morse .......................... 30/162 |
| 2,350,157 A | | 5/1944 | Disse |
| 2,506,083 A | * | 5/1950 | Hollander ..................... 30/169 |
| 2,520,464 A | * | 8/1950 | Hubner ......................... 30/286 |
| 3,092,411 A | | 6/1963 | Hardy |
| 3,250,561 A | | 5/1966 | Wilson |
| 3,317,998 A | * | 5/1967 | Matwijcow .................. 30/338 |
| 4,569,130 A | | 2/1986 | Koller et al. |
| 4,979,300 A | * | 12/1990 | Blank et al. .................... 30/169 |
| 5,176,418 A | * | 1/1993 | Niu ................................ 294/7 |
| 5,208,984 A | * | 5/1993 | Negus .......................... 30/169 |
| 5,386,633 A | * | 2/1995 | Kanno .......................... 30/169 |
| 5,528,832 A | * | 6/1996 | Schmidt ....................... 30/169 |
| 6,012,750 A | | 1/2000 | Swartz |
| 6,030,281 A | | 2/2000 | Cozzini |

(Continued)

FOREIGN PATENT DOCUMENTS

JP    05-230991    9/1993

(Continued)

OTHER PUBLICATIONS

Instruction sheets, with translation, for Spatula disclosed in U.S. Patent No. 5,386,633.

*Primary Examiner*—Bryan R Muller
(74) *Attorney, Agent, or Firm*—Ryndak & Suri LLP

(57) ABSTRACT

A spatula having a body with a top working surface and a bottom surface is provided. The spatula body also includes a first end and a second end opposite to the first end. A handle is mounted to the first end of the body and the body has a first mounting member depending from the spatula body proximate the second end of the spatula body. The mounting member has an interior for receiving a mounting portion of the spatula blade and a second open end opposed to the first open end. The spatula body includes an opening in the body for cleaning the mounting member. A blade is provided for the spatula. The blade has a front section having a top surface and a bottom surface. At least a first spring tab extends rearwardly of the front section. The spring tab has a concave surface for one of its top and bottom surfaces.

18 Claims, 11 Drawing Sheets

U.S. PATENT DOCUMENTS

| | | | |
|---|---|---|---|
| D427,858 S * | 7/2000 | Zemel | D7/692 |
| 6,209,438 B1 | 4/2001 | Mitchell et al. | |
| 6,314,849 B1 | 11/2001 | Arrasmith | |
| 6,676,181 B1 | 1/2004 | Greiner | |
| 6,742,215 B2 * | 6/2004 | Panfili et al. | 15/236.01 |
| 2004/0237747 A1 | 12/2004 | King | |

FOREIGN PATENT DOCUMENTS

| | | |
|---|---|---|
| JP | 2580196 | 10/1994 |
| JP | 09-023988 | 1/1997 |
| JP | 2001-180197 | 7/2001 |

* cited by examiner

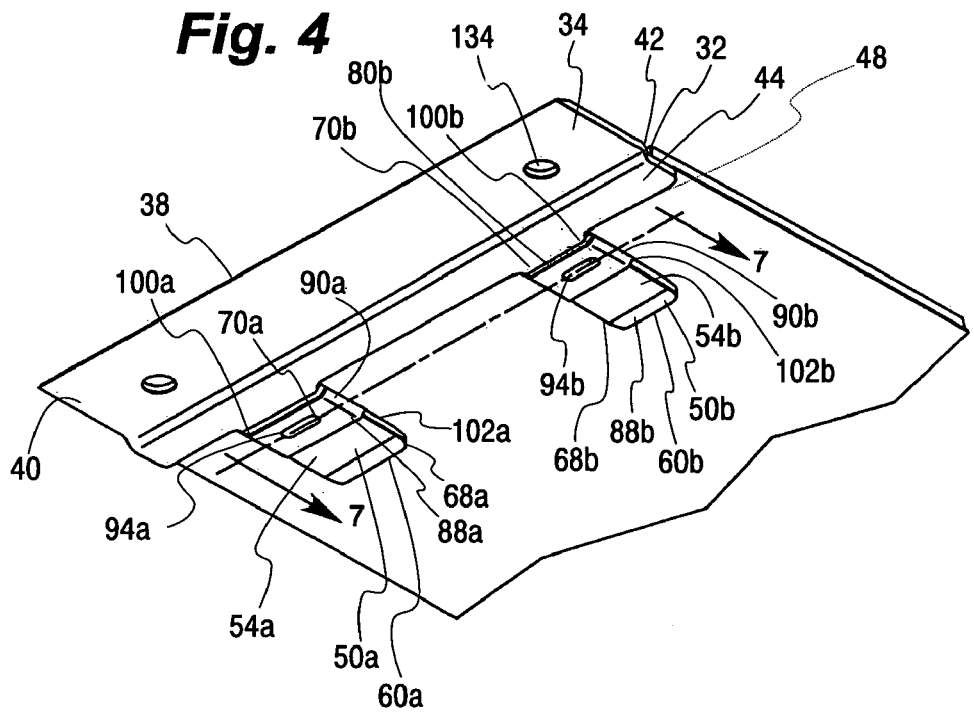
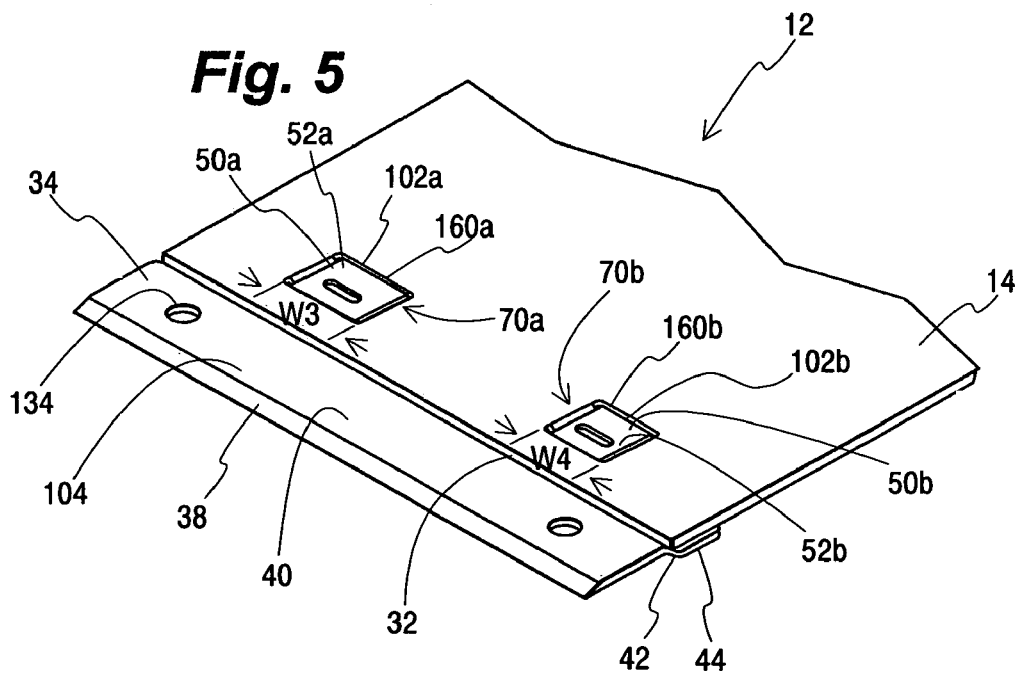

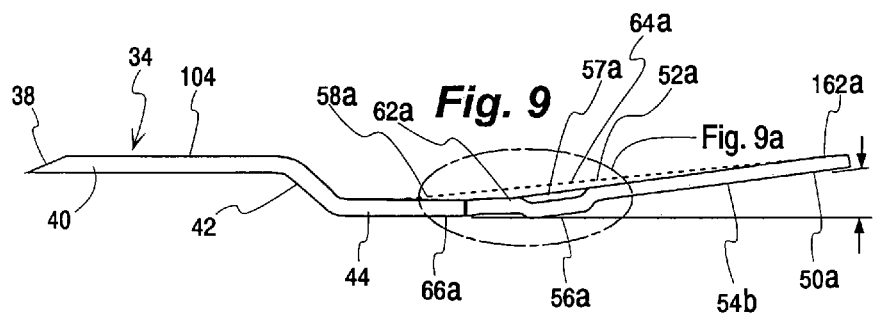
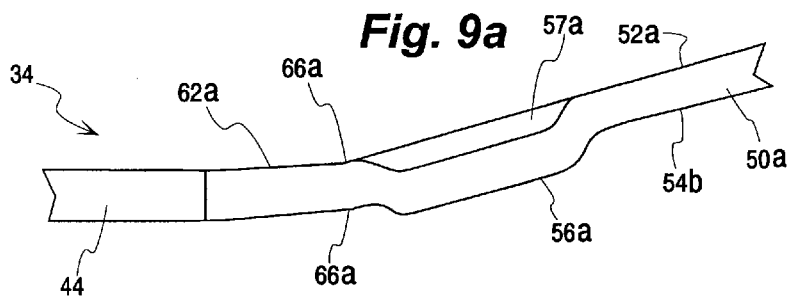
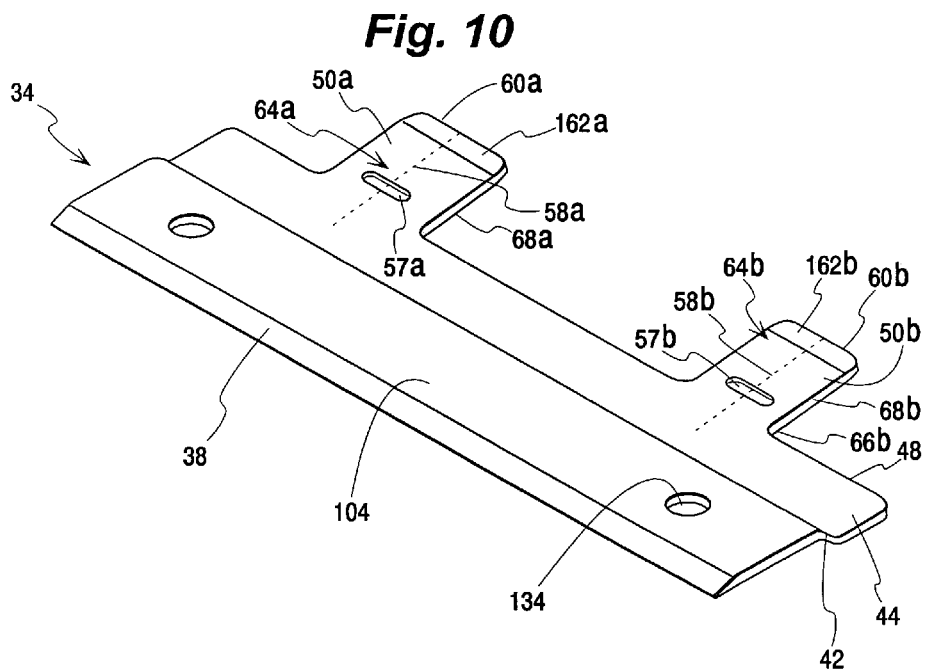

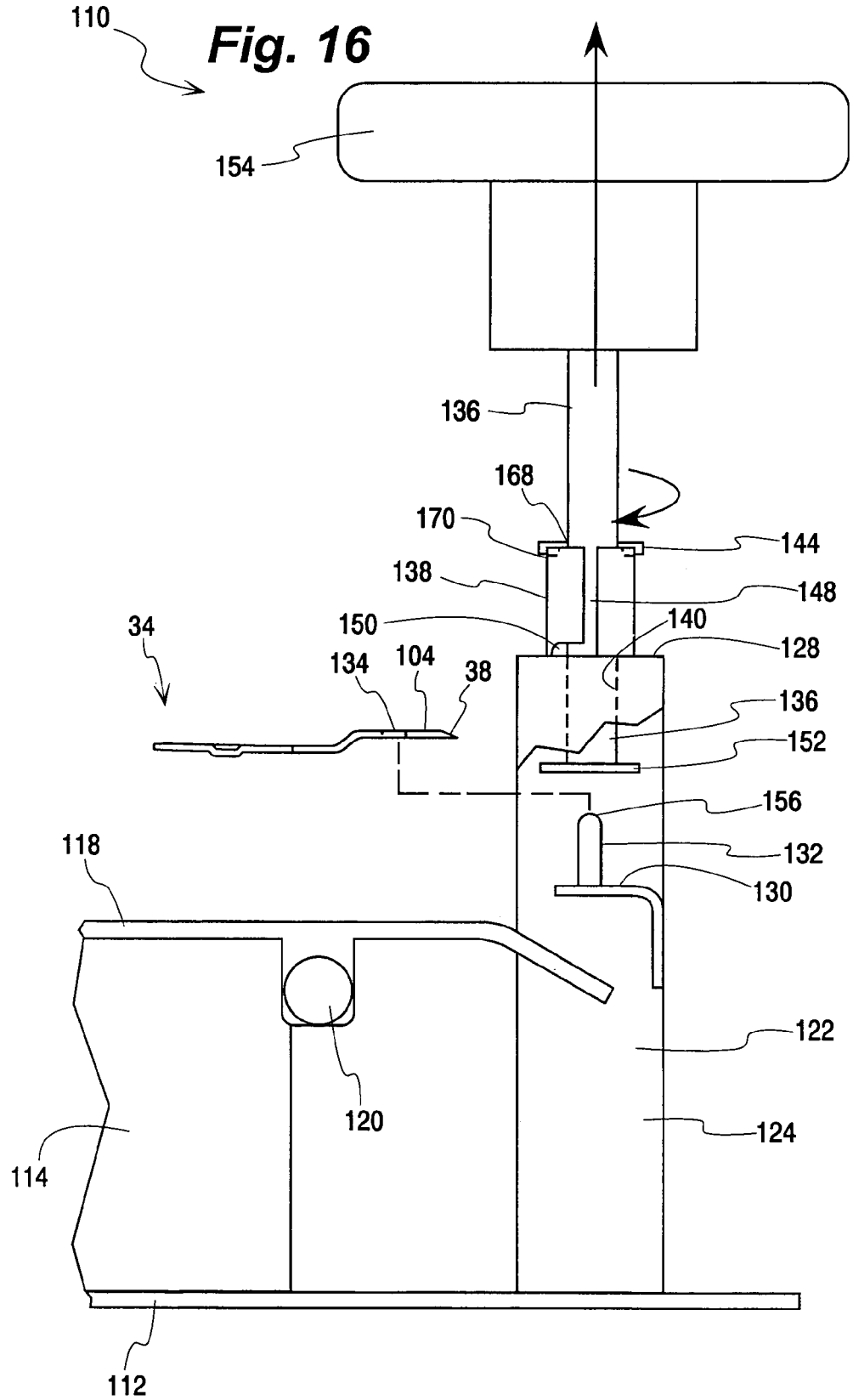

SPATULA AND BLADE

FIELD OF THE INVENTION

The present invention relates to an apparatus and method for installing and removing a spatula blade.

BACKGROUND OF THE INVENTION

Various types of spatulas have been used in connection with cooking food on a grill. It is advantageous for such a spatula to have a relatively sharp leading edge. Spatulas having replaceable blades are known.

A need exists for an improved replaceable blade spatula that reliably mounts the spatula blade to the spatula and which can be readily cleaned after periods of use. A need also exists for an improved replaceable spatula blade that can be readily securely mounted to the spatula, yet easily removed and replaced.

In addition, a need exists for a removable blade spatula that can meet NSF requirements.

However, a need exists for a convenient and safe apparatus for changing a spatula blade. It would be advantageous for the apparatus to allow efficient removal of a used blade and insertion of a replacement blade.

BRIEF SUMMARY OF THE INVENTION

In accordance with one aspect of the present invention, an improved spatula, replaceable spatula blade, apparatus for replacing a spatula blade and method for replacing a spatula blade are provided.

In accordance with one aspect of the present invention, an apparatus for installation and removal of a blade to a spatula body is provided. The apparatus includes a blade support surface for supporting a blade. A restraining element is positioned adjacent the support surface for engaging the blade to limit movement of the blade during installation and removal of the blade. A restraining member is moveable between a first position spaced from the support surface, and a second position. In the first position, the restraining member does not restrain the blade. In the second position, the restraining member limits movement of a blade supported on the support surface, while at the same time the restraining element engages and restrains the blade.

In accordance with another aspect of the invention, the restraining element is a pin that passes through a hole in the blade to restrain the blade along a first plane.

In accordance with another aspect of the invention, the restraining member clamps the blade to the blade support surface to restrain the blade at least along another plane.

In accordance with another aspect of the invention, the apparatus includes a locking mechanism for selectively preventing movement of the restraining member from a position restraining the blade, to a first position where the blade is not restrained.

In accordance with another aspect of the invention, the apparatus includes a collar, and the restraining member is slidable mounted within the collar. The collar has a first slot therein for preventing movement of the restraining member from the second position to the first position. The restraining member comprises a shaft having a pin outwardly extending from the shaft. The shaft is reciprocally mounted within the collar for axial movement therein. The collar includes a second slot connected to the first slot. The shaft is axially moveable through the collar between the first and second position when the pin is aligned with the second slot, and rotatable within the collar when the pin is aligned with the first slot. The first slot is positioned in a spaced relationship from the blade support surface so that the restraining member clamps a blade to the blade support surface when the pin is rotated within the first slot.

In accordance with another aspect of the present invention, a method of replacing a used spatula blade attached to a spatula body by a force fit is provided. The method includes providing a spatula having a spatula body and a used blade attached to the body. A blade support surface is provided to support the used blade. The blade support surface has a restraining element for engaging the blade to restrain the used blade during the removal of the used blade from the spatula body. The used blade is positioned on the blade support surface to restrain the movement of the used blade along a first plane by engaging the used blade with the restraining element. A restraining member is positioned adjacent the used blade to limit movement of the used blade at least along a second plane to prevent disengagement of the used blade from the restraining element. A force is applied to the spatula body that is at least partially directed along the first plane to separate the spatula body from the used blade, while the used blade is restrained adjacent the blade support surface. The restraint of the used blade is removed, and then the used blade is removed from the blade support surface.

In accordance with another aspect of the invention, the method may further include providing a replacement blade that is similar to the used blade and positioning the replacement blade on the blade support surface. The replacement blade is restrained from movement along the first plane by engagement of the replacement blade by the restraining element. The restraining member is positioned adjacent a surface of the replacement blade to limit movement of the replacement blade at least along the second plane to prevent disengagement of the blade from the restraining element. The spatula body is aligned with the replacement blade, and a force is applied to the spatula body. The force is at least partially directed along the first plane to move the spatula body toward the replacement blade while the replacement blade is restrained adjacent the blade support surface, to thereby mount the replacement blade to the spatula body. Thereafter, the restraint of the replacement blade is removed. The spatula and attached replacement blade can then be removed from the blade support surface.

In accordance with another aspect of the invention, the method includes clamping the used blade to the blade support surface to restrain the used blade along at least the second plane while applying the force to separate the used blade and the spatula body. The replacement blade is also clamped to the blade support surface to restrain the replacement blade along at least the second plane while applying the force to mount the replacement blade to the spatula body.

In accordance with another aspect of the invention, the restraining element is a pin that is inserted into a hole in the blade to restrain the blade.

In accordance with another aspect of the invention, a method for mounting a blade by a force fit to a spatula body is provided. The method includes providing a spatula having a body and providing a blade support surface for supporting a blade. The blade support surface has positioned adjacent thereto a restraining element for engaging the blade to restrain the blade during the attachment of the blade to the spatula body. The blade is positioned on the blade support surface, and the movement of the blade is restrained along a first plane by engagement of the blade by the restraining element. A restraining member is positioned adjacent the blade to restrain movement of the blade at least along a second plane to prevent disengagement of the blade from the restraining element. The spatula body is aligned with the blade. A force is applied to the spatula body that is at least partially directed along the first plane to mount the blade to the spatula body. Thereafter the restraint of the blade by the restraining member and by the restraining element is removed, and the spatula body with the attached blade can be removed from the blade support surface.

In accordance with another aspect of the invention, a spatula is provided. The spatula has a body with a top working surface and a bottom surface. The spatula body also includes a first end and a second end opposite to the first end. A handle is mounted to the first end of the spatula body. The spatula body has a first mounting member depending from the spatula body proximate the second end of the spatula body. The mounting member has an interior for receiving a mounting portion of a spatula blade. The mounting member has an open first end proximate to and facing the second end of the spatula body and a second open end opposed to the first open end.

In accordance with another aspect of the invention, the mounting member is positioned adjacent to the bottom surface of the body. The top working surface of the body has an opening adjacent the mounting member for providing access for cleaning the mounting member.

In accordance with another aspect of the invention, the spatula has a second mounting member laterally spaced from the first mounting member.

In accordance with another aspect of the invention, the mounting members each have a respective mounting passageway extending from the front to the rear of the mounting member. Each passageway extends generally perpendicular to the front edge of the spatula body. The mounting members may be positioned adjacent to the bottom surface of the spatula body and the top working surface of the body has an opening adjacent each mounting member for providing cleaning access to the mounting members.

In accordance with another aspect of the invention, the mounting members are tab receiving members, and each mounting member includes a bottom and first and second sidewalls. The bottom of each mounting member has a flat top surface with an opening in the top surface of the bottom of the mounting member. The sidewalls of the mounting member extend along a line that is generally perpendicular to the second end of the body.

In accordance with another aspect of the invention, the spatula includes a blade mounted at the second end of the body. The blade includes a front end and a rear end with the rear end of the blade being mounted in the mounting member to secure the blade to the body. The spatula may still further include a blade that has a replacement leading end for insertion through the mounting member. The blade may include a front section and an intermediate section, and a step joining the front section to the intermediate section. The blade includes at least one tab extending from the intermediate section of the blade. The tab has a rear end that provides the replacement leading end. The replacement leading end is slidably mounted into the mounting member. The blade may be further characterized by the tab extending rearward of the open rear end of the mounting member with the tab contacting the bottom surface of the spatula body rearward of the rear opening.

In accordance with another aspect of the invention, the tab has an upwardly concave upper surface, the concave upper surface of the tab contacting the bottom of the surface of the body rearward of the mounting member. The tab acts as a spring to bias the tab against the mounting member. The tab may have a lug that nests within a recess in the mounting member.

In one embodiment the one mounting member has an open second end that is larger than the open second end of the other mounting member so that the blade can only be mounted on the spatula body with the top surface of the blade upward relative to the body.

In accordance with another aspect of the invention, a blade for a spatula is provided. The blade has a front section with a top surface and a bottom surface. The front section includes a sharp front edge for directing an item onto the top surface of the front section. At least a first spring tab extends rearwardly of the front section. The spring tab has a top surface, a bottom surface and a leading replacement end. The tab has a concave surface for one of the bottom and top surfaces of the spring tab with the concave surface forming a spring tab.

In another aspect of the invention the spring tab includes a lug. The lug is positioned on the top or bottom surface of the lug opposite the concave surface. The spring tab has a bend in the tab to form the concave surface. The bend is positioned adjacent the lug. The blade may have a second spring tab.

In another aspect of the invention, the second spring tab has a second leading replacement end that is larger than the replacement leading end of the first tab.

In accordance with another aspect of the invention, the blade has an intermediate section and a stepped section. The stepped section connects the intermediate section with the front section. The intermediate section has a top surface and a bottom surface, with the top surface of the intermediate section spaced downward of the top surface of the front section. The top surface of the front section lies along a first plane and the intermediate section lies along a second plane that is generally parallel to the first plane. The tab may extend rearwardly from the intermediate section, and further include a generally rectangular shaped tab with a replacement leading end that includes a chamfer on the rear of the blade.

BRIEF DESCRIPTION OF THE SEVERAL VIEWS OF THE DRAWINGS

FIG. 4 is a partial bottom perspective view of the spatula illustrating a blade mounted to the spatula body;

FIG. 5 is a partial top perspective view of the spatula illustrating a blade mounted on the spatula body;

FIG. 9 is a side view of the blade exaggerating the upward bow in a tab of the blade;

FIG. 9a is a detail view of the upward bow in the tab of FIG. 9;

FIG. 10 is a perspective view of the blade exaggerating the upward bow in both of the tabs of the blade;

FIG. 16 is a side view of the blade installation and removal apparatus with the shaft in an upward position with the shaft pin nested in a groove in the top surface of the collar to prevent unintended rotation of the shaft.

DETAILED DESCRIPTION OF THE INVENTION

Figure 1:
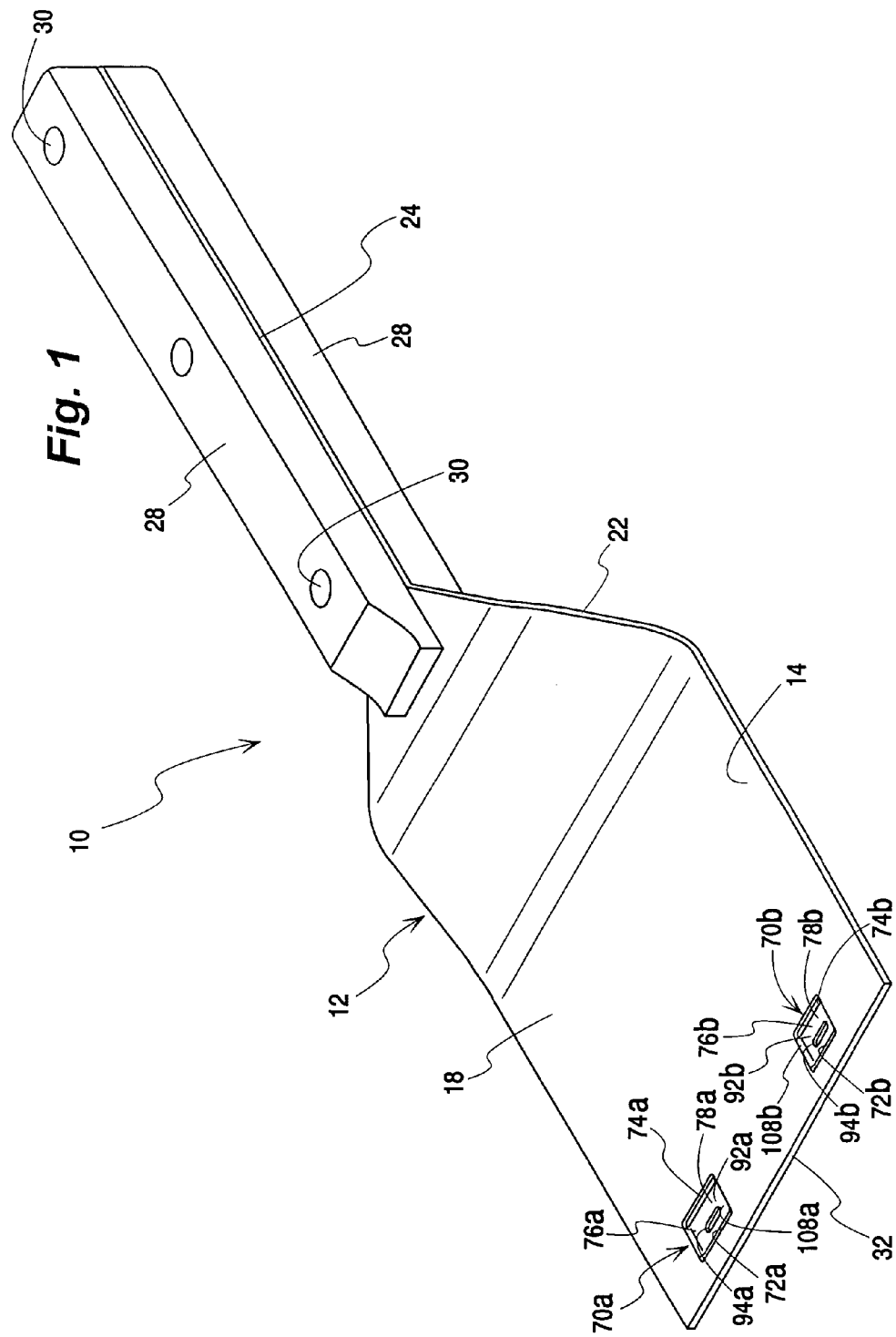
FIG. 1 is a perspective view of the spatula of the invention prior to mounting a blade thereto.

Referring to the figures generally, and in particular FIGS. 1 and 5, a spatula 10 in accordance with the invention is illustrated. Spatula 10 has a body 12 that includes a generally planar working portion 14 with a top working surface 18 and an opposite bottom surface 20. Body 12 also has a transition section 22 leading to an offset shank 24. A handle 28, formed of a heat insulating material, is attached to shank 24 by any suitable means, such as by rivets 30. A blade 34, having a sharp front end 38, is removably mounted to the front edge 32 of body 12.

Spatula 10 is typically used by gripping handle 28 and sliding bottom surface 20 of spatula 10 along a cooking surface to move, flip or transport a food item cooking on the cooking surface. Blade 34 is slid under the cooking food item, such as a hamburger patty, to position the hamburger patty on top working surface 18. Spatula 10 may then be turned by the user to cause the patty to be flipped over to its opposite side for further cooking. Once the cooking of the patty is complete, the spatula 10 once again is slid under the patty to position the patty onto working surface 18 of spatula 10. The patty can then be transported to a desired location, such as placement on a hamburger bun or serving plate. Spatula 10 also is typically used to clean a cooking surface, such as a grill, by scraping spatula 10 along the grill surface to remove residual food particles.

Referring now to FIGS. 2-4 and 8-10, it can be seen that blade 34 has a front section 40, and a stepped section 42 that joins an intermediate section 44 of blade 34 to front section 40. Extending from the rear edge 48 of intermediate section 44 are mounting portions, or tabs 50a, 50b, for use in mounting blade 34 to spatula body 12. Tabs 50a, 50b each have an upper surface 52a, 52b and a lower surface 54a, 54b. Lugs 56a, 56b project from each lower surface 54a, 54b, respectively. Each of tabs 50a, 50b terminates in a rear, or replacement leading end 60a, 60b. Tabs 50a, 50b further include side edges 68a, 68b, respectively.

As best seen in FIGS. 9 and 9a, tabs 50a, 50b have slightly concave top surfaces 62a, 62b, forming bows 64a, 64b, respectively, as best seen in FIGS. 9-10 where slight bows 64a, 64b are exaggerated for illustrative purposes. As described later in greater detail, bows 64a, 64b are provided to more positively secure blade 34 to spatula body 12. Each bow 64a, 64b lies along a line 58a, 58b that may extend from replacement leading end 60a, 60b, along tab 50a, 50b, and into intermediate section 44. Concave surfaces 62a, 62b may be formed from a bend 66a, 66b, respectively. Preferably, bends 66a, 66b are formed proximate or adjacent to lugs 56a, 56b, respectively. Tab 50a and tab 50b may optionally be formed with differing widths W1, W2, respectively, or other differing dimensions. This prevents blade 34 from being mounted in an upside down position relative to spatula body 12, as described more fully below.

Bottom surface 20 of body 12 has a pair of mounting members 70a, 70b for cooperation with tabs 50a, 50b, respectively, to removably secure blade 34 to spatula body 12. Mounting members 70a, 70b may be of any suitable shape allowing cooperation with the shape of tabs 50a, 50b of blade 34. In the preferred embodiment, mounting members 70a, 70b have a "U" shaped profile to cooperate with the rectangular shaped profile of replacement leading ends 60a, 60b of tabs 50a, 50b, respectively. Of course, other cooperating shapes may be chosen for mounting members 70a, 70b and tabs 50a, 50b, respectively. Preferably, mounting members 70a, 70b are positioned to extend generally perpendicularly to front edge 32 of spatula body 12. Likewise, tabs 50a, 50b are positioned to extend generally perpendicularly to rear edge 48 of blade 34.

Each mounting member 70a, 70b may be formed by a stamping process. Prior to stamping, front slots 72a, 72b and rear slots 74a, 74b are formed to extend through body 12. The material of the sections 78a, 78b located between front slots 72a, 72b and rear slots 74a, 74b, respectively, is then tamped to depress sections 78a, 78b. The stamping action causes the material of sections 78a, 78b to be projected downward relative to bottom surface 20, and to thereby form mounting members 70a, 70b, respectively. Lugs 56a, 56b may also be formed by stamping, and if formed by stamping, will incidentally produce depressions 57a, 57b, respectively.

Figure 2:
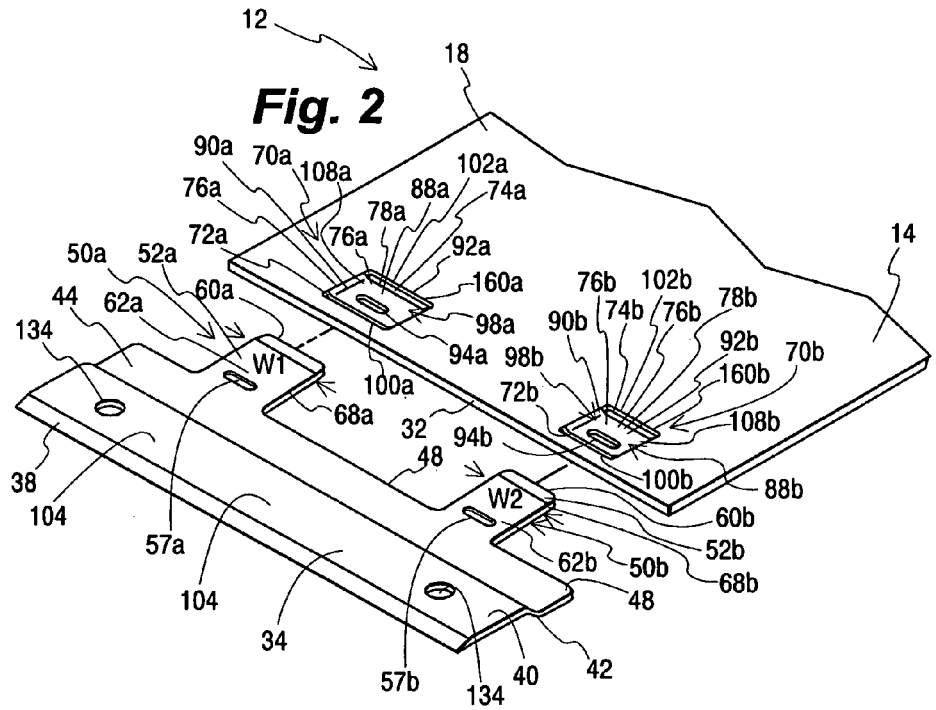
FIG. 2 is a partial top perspective view of the spatula illustrating the mounting of a blade to the spatula body.
Figure 3:
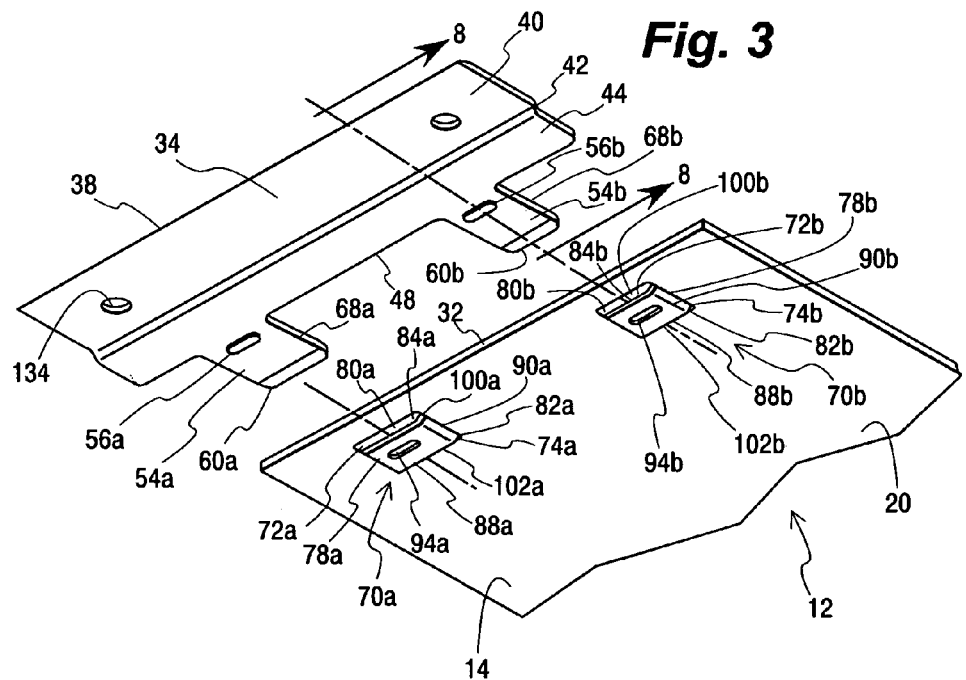
FIG. 3 is a partial bottom perspective view of the spatula illustrating the mounting of a blade to the spatula body.
Figure 6:
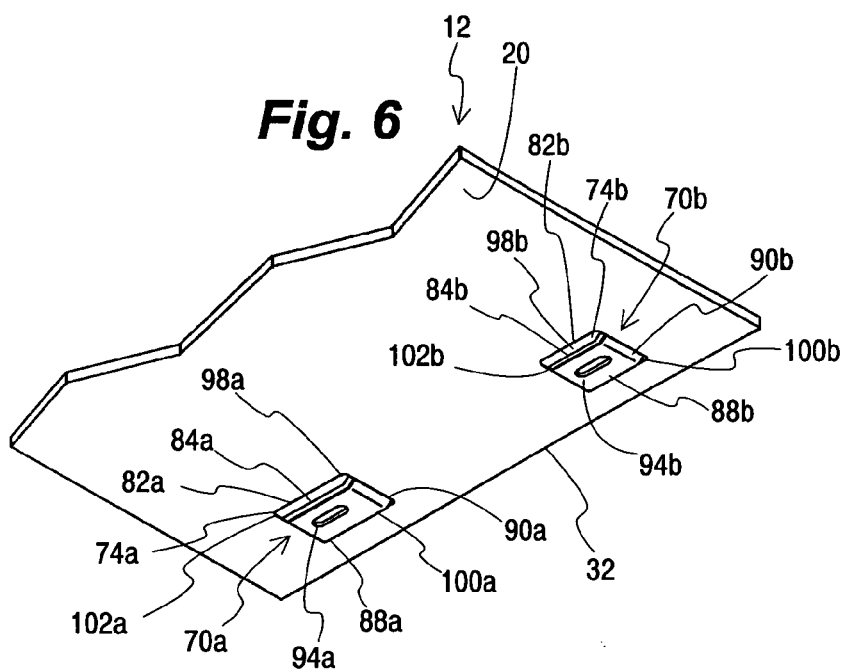
FIG. 6 is a partial perspective bottom view showing the rear opening of the mounting members on the bottom of the spatula body.

As best seen in FIGS. 2, 3 and 6, each mounting member 70a, 70b has a front opening 80a, 80b and a rear opening 82a, 82b providing a tab receiving passageway 84a, 84b through each mounting member 70a, 70b, respectively. Each of mounting members 70a, 70b also has a bottom 88a, 88b and sidewalls 90a, 90b for engaging tabs 50a, 50b, respectively. The top surface 92a, 92b of each mounting member bottom 88a, 88b has a recess, or hole 94a, 94b for cooperating with lugs 56a, 56b when tabs 50a, 50b are mounted within mounting members 70a, 70b, respectively.

Figure 7:
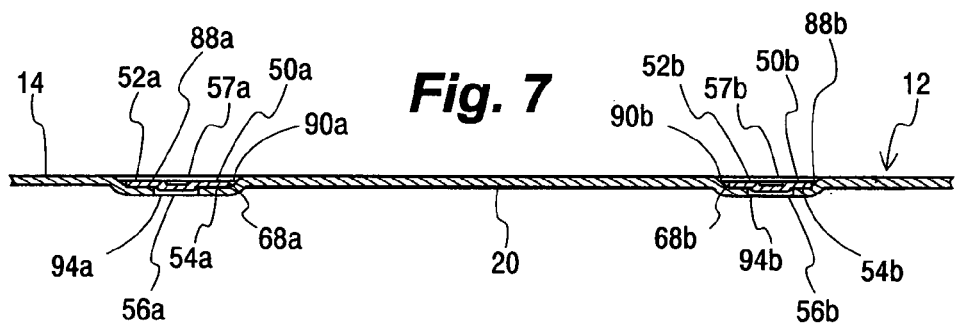
FIG. 7 is a cross sectional view of the blade taken along line 7-7 of FIG. 4.

Thus, blade 34 can be mounted to spatula 10 by inserting the replacement leading ends 60a, 60b into front openings 80a, 80b of mounting members 70a, 70b and out rear openings 82a, 82b, respectively. During insertion, the lower surfaces 54a, 54b of tabs 50a, 50b slide over top surfaces 92a, 92b of mounting members 70a, 70b, respectively. As blade 34 is advanced, lugs 56a, 56b snap into place within recesses 94a, 94b to secure tabs 50a, 50b within the interiors 98a, 98b of mounting members 70a, 70b. FIG. 7 best illustrates lugs 56a, 56b positioned within openings 94a, 94b, respectively.

The insertion of blade 34 terminates as stepped section 42 of blade 34 abuts front edge 32 of spatula body 12, while at the same time rear edge 48 of intermediate section 44, contacts the front edges 100a, 100b of mounting members 70a, 70b, respectively. Thus, once fully inserted, tabs 50a, 50b extend from the front edge 100a, 100b to past the rear edge 102a, 102b of mounting members 70a, 70b, respectively.

Due to the offset of stepped section 42, the top surface 104 of front section 40 of blade 34 is generally coplanar with the top working surface 18. Thus, the top surface 104 of blade 34 and top working surface 18 of body 12 provide a generally continuous flat surface for use in picking up a food item from a cooking surface. The flat surface is useful in keeping a fragile food item, such as a partially cooked hamburger, intact. In this regard, it is also noted that tabs 50*a*, 50*b* at least partially fill the stamped down depressions 108*a*, 108*b* that interrupt the otherwise continuous top working surface 18.

Spatula 10 is particularly suitable for high volume commercial use, where blades 34 need to be replaced relatively often due to wear. Also of particular importance, especially for commercial applications, is that spatula 10 is capable of meeting NSF certification requirements. Specifically, it is noted that once blade 34 has been removed from spatula body 12, all surfaces of working portion 14 are exposed and accessible for cleaning. In particular, it is pointed out that top surfaces 92*a*, 92*b* of mounting members 70*a*, 70*b* are respectively easily accessed for cleaning through openings 76*a*, 76*b* in top working surface 18 of spatula body 12. Thus, top working surface 18, bottom surface 20, and all surfaces of mounting members 70*a*, 70*b* may be readily cleaned. Spatula body 12 has no pockets or crevices that are difficult to reach for cleaning, or where food particles might otherwise be missed during cleaning. Such food particles are highly undesirable, not only due to potential bacterial growth on spatula 10, but because the retained food particles may also affect the taste of a food item when spatula 10 is later used for cooking other food items.

As previously briefly noted, spatula 10 may optionally be provided with means to ensure that blade 34 is attached with top surface 104 facing upwards and properly orientated with spatula body 12. Such means may include forming tab 50*a* with a width W1 that is larger than the width W2 of tab 50*b*. Likewise, the width W3 of front opening 80*a* of mounting member 70*a* is formed to be larger than the width W4 of front opening 80*b* of mounting member 70*b*. Thus, when blade 34 is positioned upside down, mounting blade 34 to spatula body 12 is not permitted, since larger tab 50*a* is too large for insertion into the smaller front opening 80*b*. Only when blade 34 is oriented facing upwards relative to an upwardly oriented spatula body 12, are tabs 50*a*, 50*b* able to be inserted into mounting members 70*a*, 70*b*, respectively.

Due to the force fit between tabs 50*a*, 50*b* and mounting members 70*a*, 70*b*, considerable force may be required to mount blade 34 to body 12. When attempting to apply the required force by pushing or pulling on blade 34 with an unprotected hand, injuries from relatively sharp front edge 38 are possible. Potential injury is also likely in removing blade 34 from body 12. To avoid potential injury, a blade installation apparatus 110 is provided for safely and conveniently installing or removing blade 34 to body 12.

Referring now to FIGS. 11-16, apparatus 110 has a base 112 that may include an optional blade storage box 114. Pivotably mounted on storage box 114 is a spatula support platform 118 that is connected to box 114 by a hinge 120. A latch 116 may be provided to secure platform 118 in a downward, closed position. When platform 118 is pivoted to an open position (not shown), access is provided to the interior of blade storage box 114. Secured to base 112 is an upwardly extending frame 122. Frame 122 includes side supports 124, a top 128 and a blade support 130. Blade support 130 has a pair of pins 132, for cooperation with a pair of holes 134 in front section 40 of blade 34. When pins 132 engage holes 134, blade 34 is restrained from shifting back and forth. Thus, blade 34 is held in place to allow the insertion and removal of blade 34 from spatula body 12.

Figure 11:
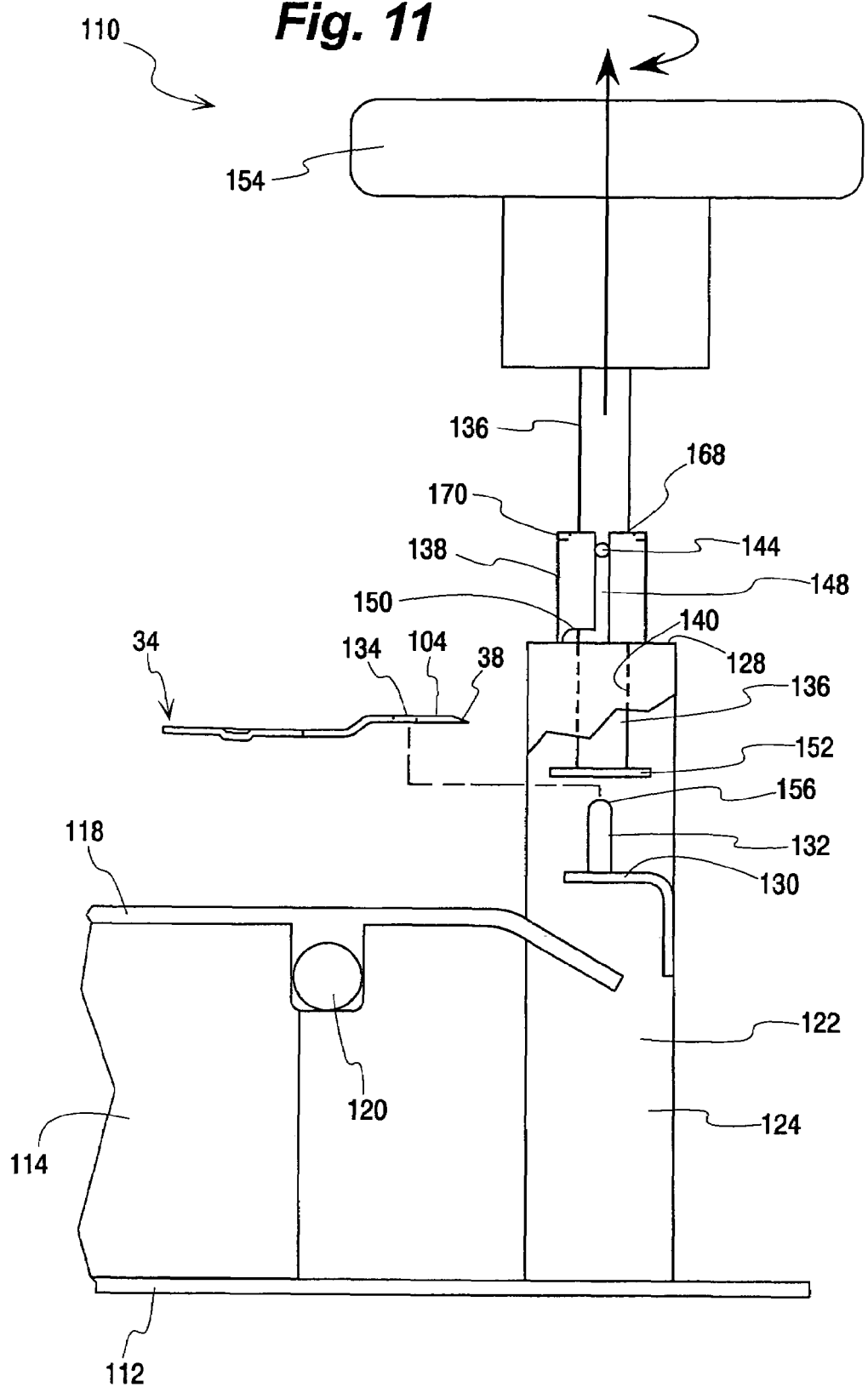
FIG. 11 is a side plan view of the blade installation and removal apparatus of the invention illustrating the shaft pin aligned in the vertical slot of the collar.

Blade installation apparatus 110 also includes a shaft, or clamping member 136, for preventing up and down movement of blade 34 during installation and removal. Positioned on frame top 128 is a locking collar 138 having a bore 140 axially extending therethrough. Collar 138 also has a vertical slot 148 that leads to a horizontal slot 150. Shaft 136 is slidably mounted within bore 140 in collar 138, and is moveable up and down only when pin 144 is aligned with vertical slot 148. FIG. 11 shows shaft 136 in the upward position with pin 144 aligned with vertical slot 148. When so aligned, shaft 136 is permitted to fall downwardly to the position of FIG. 13, with the head 152 of shaft 136 abutting blade 34 as it is positioned on blade support 130.

Figure 13:
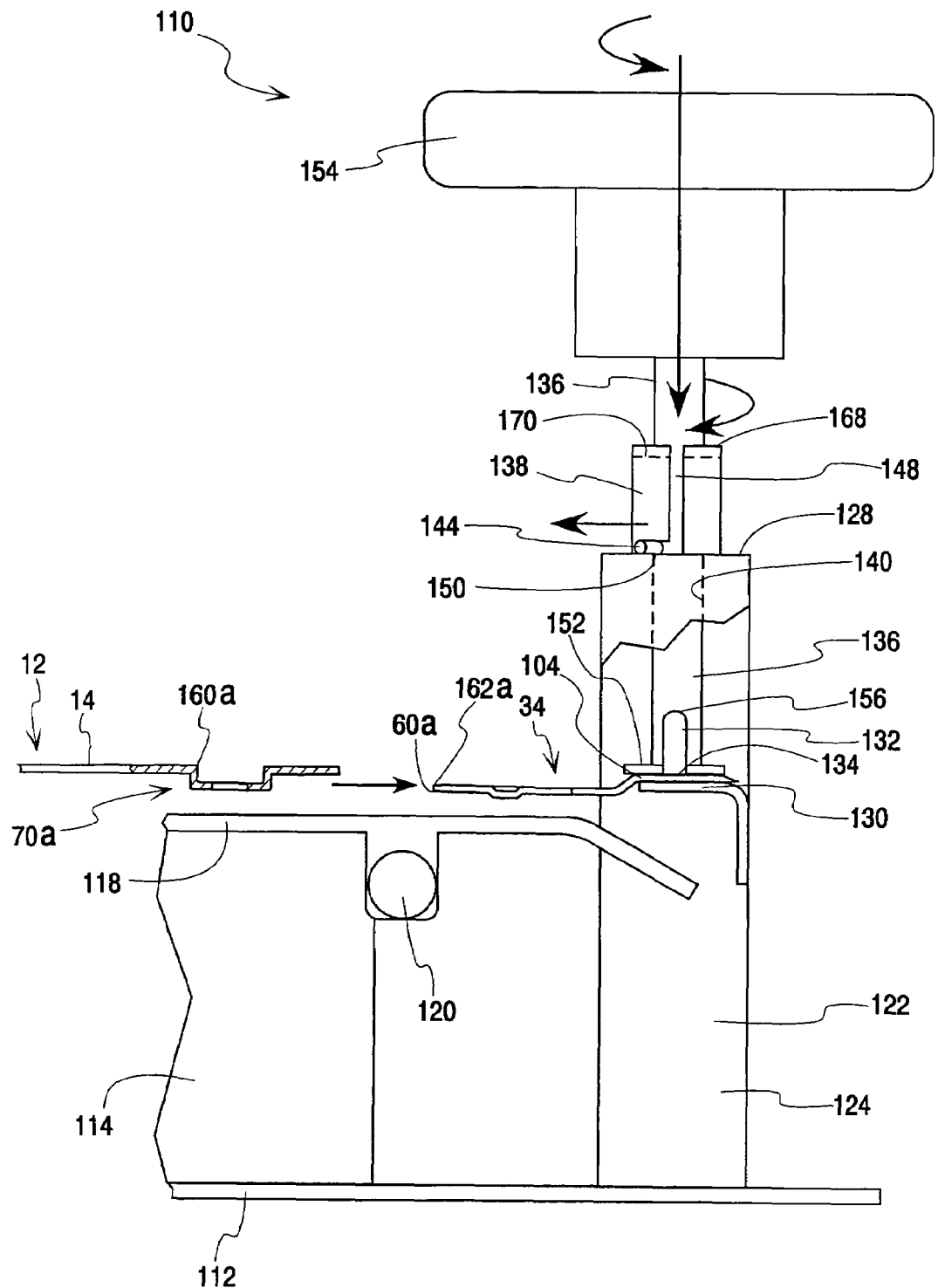
FIG. 13 is a side view of a blade secured to the blade installation and removal apparatus and a spatula body being advanced toward the blade for mounting thereto, showing the shaft pin aligned and locked in the horizontal shaft of the collar to clamp the blade to the apparatus.

Once shaft 136 has been moved to the downward position, shaft 136 may be rotated by means of a handle 154 to cause pin 144 to enter horizontal slot 150 in collar 138. In this position, as shown in FIG. 13, shaft head 152 limits upward movement of blade 34 to prevent disengagement of blade 34 from pins 132. Shaft head 152 prevents disengagement of blade 34 from pins 132 as long as shaft head 152 limits upward movement of blade 34 so that blade 34 does not rise above the top 156 of pins 132. Preferably however, shaft head 152 contacts top surface 104 of blade 34 and clamps blade 34 to blade support 130. Cooperation of pin 144 and horizontal slot 150 prevents upward and downward movement of shaft 136, and maintains shaft head 152 in the clamping position relative to blade support 130. Thus, vertical movement of blade 34 is restrained by shaft head 152. Also, since shaft head 152 clamps blade 34 to support 130, horizontal movement of blade 34 is restrained by shaft head 152, in addition to the horizontal restraint provided by pins 132.

Figure 12:
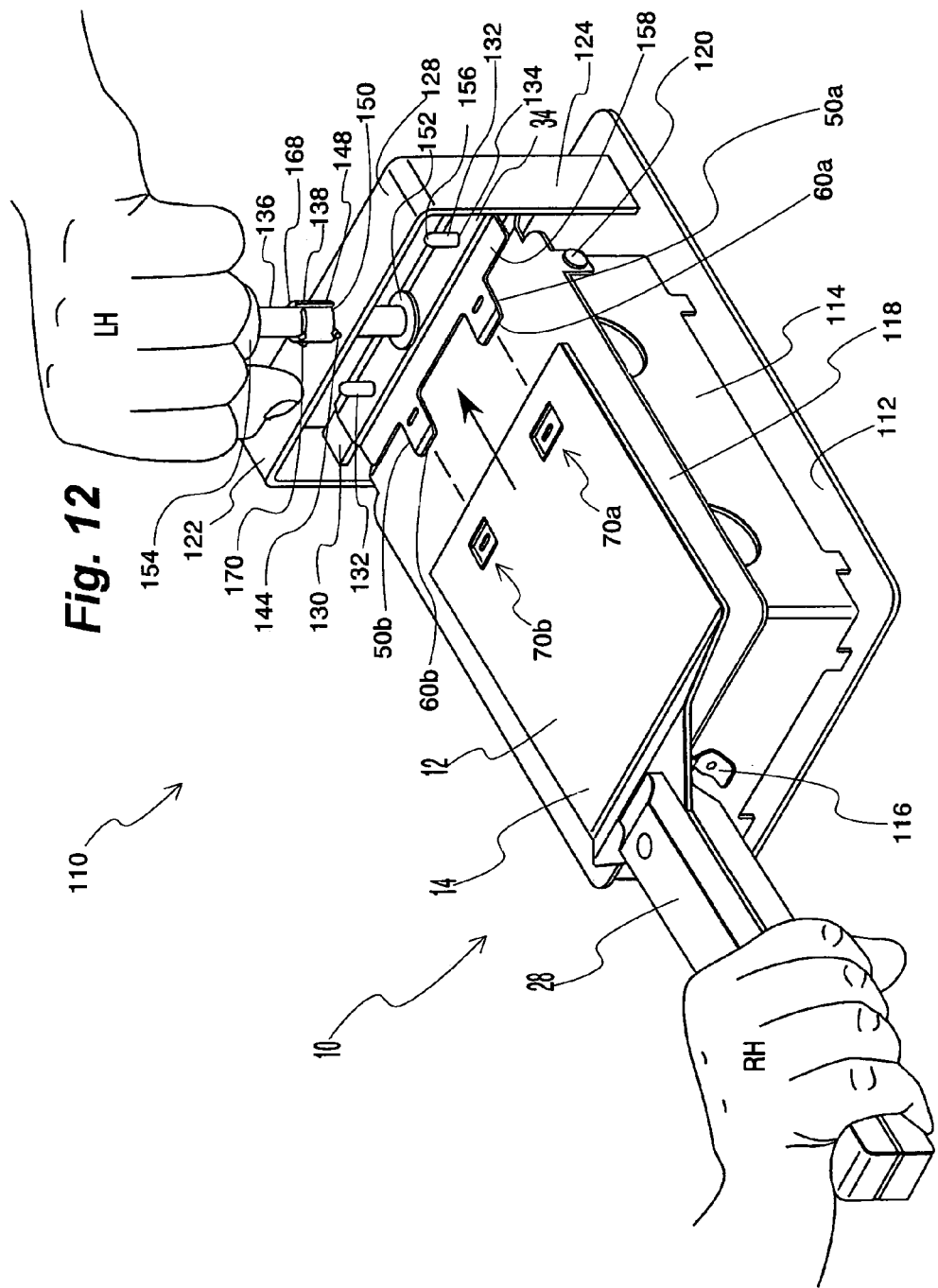
FIG. 12 is a perspective view of a blade secured to the blade installation and removal apparatus, and a spatula body being advanced toward the blade for mounting thereto.

As illustrated in FIGS. 12-13, when blade 34 is clamped against the top surface 158 of blade support 130, tabs 50*a*, 50*b* are relatively parallel to generally horizontal platform 118. Thus, by resting spatula bottom surface 20 on platform 118, mounting members 70*a*, 70*b* can be more easily aligned with tabs 50*a*, 50*b* prior to insertion. In this regard, it is noted that the top surface 158 of blade support 130 is spaced upward from platform 118. Thus, when blade 34 is locked in place by head 152, tabs 50*a*, 50*b* are spaced from platform 118 to facilitate the passing of bottoms 88*a*, 88*b* of mounting members 70*a*, 70*b* under tabs 50*a*, 50*b* respectively, during the insertion of blade 34 onto spatula body 12.

With a new blade 34 clamped in position on blade support 130, mounting to spatula body 12 may take place. To do so, handle 28 is gripped and spatula body 12 is positioned to rest upon platform 118. As illustrated in FIG. 12, replacement leading edges 60*a*, 60*b* of tabs 50*a*, 50*b* are aligned for insertion through front openings 80*a*, 80*b* of mounting members 70*a*, 70*b*, respectively. Spatula body 12 is advanced forward to insert tabs 50*a*, 50*b* into interiors 98*a*, 98*b* of mounting members 70*a*, 70*b* respectively. While advancing spatula body 12, adjustments in the vertical alignment of mounting members 70*a*, 70*b* relative to tabs 50*a*, 50*b* may be made by pivoting body 12 upwardly or downwardly on platform 118.

Figure 8:
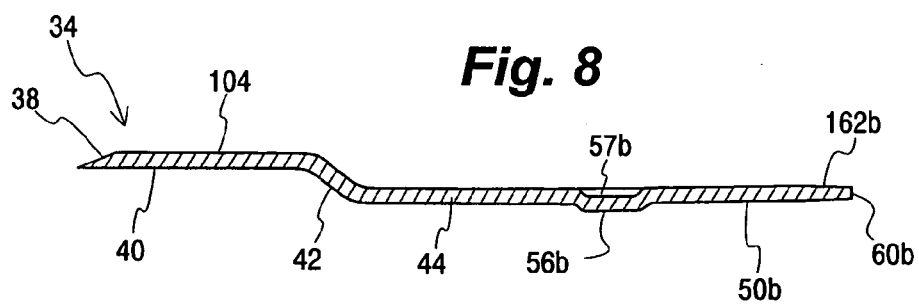
FIG. 8 is a cross sectional view of the blade taken along line 8-8 of FIG. 3.

Typically, spatula body 12 is relatively easily advanced until replacement leading edges 60*a*, 60*b* contact the edges 160*a*, 160*b* of rear slots 82*a*, 82*b*, respectively. As shown in FIG. 8, an optional chamfer 162*a*, 162*b* may be provided on each of the top surfaces 52*a*, 52*b* of tabs 50*a*, 50*b* adjacent replacement leading ends 60*a*, 60*b*, respectively. Chamfers 162*a*, 162*b* aid in directing replacement leading ends 60*a*, 60*b* underneath and past edges 102*a*, 102*b* of slots 82*a*, 82*b*, respectively. As spatula body 12 continues to advance, upwardly bowed tabs 50*a*, 50*b* are compressed to create a biasing force that pushes lower surfaces 54*a*, 54*b* of tabs 50*a*, 50*b* against top surface 92*a*, 92*b* of mounting members 70*a*, 70*b*. When front edge 32 of body 12 is fully advanced to abut stepped section 42 of blade 34, lugs 56*a*, 56*b* are snapped in place within recess openings 94*a*, 94*b* in mounting members 70*a*, 70*b*, as previously described.

Thus, tabs 50*a*, 50*b* are securely held within mounting members 70*a*, 70*b*, respectively, by friction, by lugs 56*a*, 56*b* and by the biasing force provided by concave surfaces 62a, 62b. The frictional forces arise from contact between the surfaces of body 12 and blade 34. These surfaces include blade 34 contacting bottom surface 20 of spatula body 12 at locations both forward and rearward of mounting members 70a, 70b. Bottom surfaces 54a, 54b and side edges 68a, 68b of tabs 50a, 50b also contact top surfaces 92a, 92b and sidewalls 90a, 90b of mounting members 70a, 70b, respectively. It also is noted that the spring like action created by bows 64a, 64b in tabs 50a, 50b helps maintain lugs 56a, 56b locked in place within recesses 94a, 94b, respectively.

Figure 14:
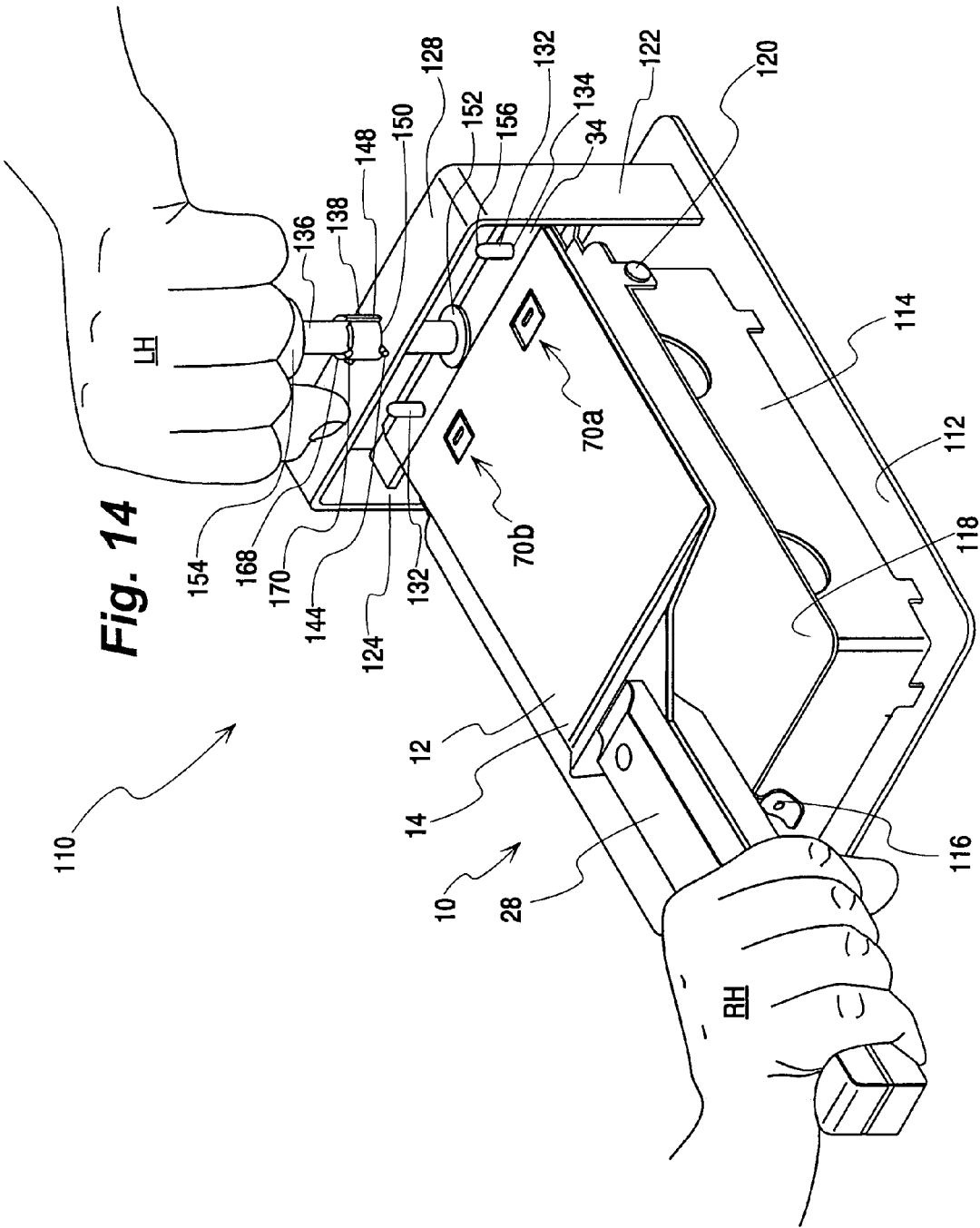
FIG. 14 is a perspective view of a blade secured to the spatula body and the blade secured to the blade installation and removal apparatus as it appears just after mounting a blade or just prior to initiating removal of a blade.

FIG. 14 shows body 12 once it has been fully advanced to be securely mounted to blade 34. Thereafter, shaft 136 is moved from the locked position of FIG. 13 to the unlocked position of FIG. 11. To do so, handle 154 is turned to align pin 144 with vertical slot 148. Shaft 136 is then raised until pin 144 clears the top surface 168 of collar 138. To maintain shaft 136 in a raised position, shaft 136 may then be turned to allow pin 144 to rest against collar top surface 168. As shown in FIG. 16, pin 144 may be nested within a groove 170, optionally provided in the top surface of collar 168, to prevent inadvertent realignment of pin 144 and vertical slot 148. Body 12 and attached blade 34 may then be disengaged from pins 132, and removed from apparatus 110.

Apparatus 110 may also be used to remove a used blade 34 from spatula 10. To do so, blade 34 is positioned with holes 134 of blade 34 placed over pins 132 on blade support 130. Blade 34 is then clamped to blade support 130 by downward movement of shaft head 152 from the position illustrated in FIG. 11 to the clamping position illustrated in FIG. 13. In this position, shaft 136 has been locked in place by rotating pin 144 within horizontal slot 150 to a locked position, as previously described.

Figure 15:
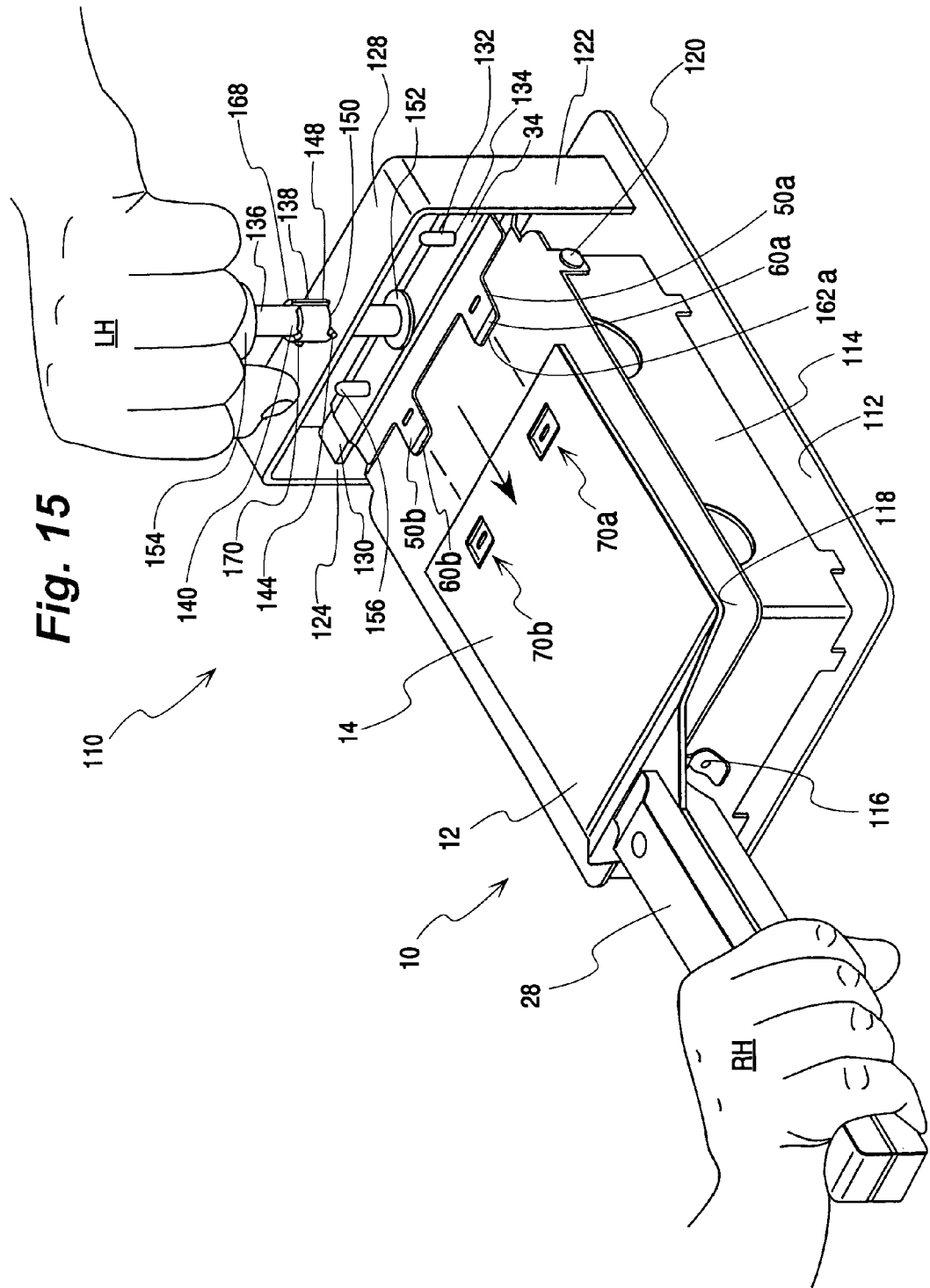
FIG. 15 is a perspective view of a blade secured to the blade installation and removal apparatus and a spatula body having been withdrawn from attachment to, the blade.

FIG. 14 shows the position of a spatula 10 secured in apparatus 110 prior to removal of blade 34 from spatula body 12. To separate blade 34 and body 12, a rearward force is applied to handle 28. This force pulls spatula body 12 rearward from blade 34 while blade 34 is restrained from movement on blade support 130 of apparatus 110. As shown in FIG. 15, spatula body 12 is moved rearwardly until completely separated from blade 34. Thereafter, pin 144 is rotated to realign with vertical slot 148. Shaft 136 can then be lifted upward to the position shown in FIG. 16, and used blade 34 can be removed from support 130 and discarded.

It can therefore be appreciated that blade installation apparatus 110 may be used to both install and remove blade 34 safely. Since the force to join or separate a blade 34 to body 12 is applied by simultaneously gripping spatula handle 28 and handle 154, both the operator's left hand LH and right hand RH remain spaced from sharp edge 38 of blade 34 to thereby avoid injury. Moreover, shaft 136 may be locked in the downward position to prevent unintended disengagement of pins 132 from holes 134 during application of the force to mount or remove blade 34. A sudden and unexpected disengagement of blade 34 from pins 132 could result in hand and other injuries for the operator, and/or injuries to other persons present in the vicinity.

It is also once again noted, that once blade 34 is removed from spatula body 12, spatula body 12 may be easily and readily cleaned. All surfaces of working portion 14 are readily exposed for cleaning, including mounting member interiors 98a, 98b. For example, there are no recessed pockets or small grooves that can collect and harbor food debris. Thus, spatula 10 may be easily and readily thoroughly cleaned, and the design of spatula 10 can comply with requirements for NSF certification.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed:

1. A spatula comprising:
   a spatula body having a working portion with a top working surface and a bottom surface, the spatula body also including a first end and a second end opposite to the first end;
   a handle mounted to the first end of the spatula body;
   a first mounting member in the working portion of the spatula body and depending from the spatula body proximate the second end of the spatula body, the mounting member having first and second sides, each connecting the mounting member to the spatula body and the mounting member having an interior for receiving and an interior surface for contacting a mounting portion of a spatula blade when secured to the spatula body;
   the interior of the mounting member having an open first end proximate to and facing the second end of the spatula body and the interior of the mounting member having a second open end opposed to the first open end; and
   an access opening extending through the top working surface of the spatula body, the access opening being positioned opposite the mounting member and between the first and second open ends of the mounting member to provide access through the top working surface of the spatula body to permit cleaning of the interior and the interior surface of the mounting member.

2. The spatula of claim 1 wherein the mounting member is adapted to engage the mounting portion of a spatula blade in a force fit and is generally U-shaped and is spaced inwardly from the second end of the spatula body.

3. The spatula of claim 1 further comprising a second mounting member laterally spaced from the first mounting member.

4. The spatula of claim 3 further comprising blade orienting means for receiving a blade in proper orientation relative to the spatula body wherein the second mounting member has an open second end that is larger than the open second end of the first mounting member to prevent a blade from being mounted in an inverted orientation to the first and second mounting members.

5. The spatula of claim 3 wherein the first and second mounting members each have respective first and second sidewalls that extend along a line generally perpendicular to the second end of the spatula body with a respective mounting passageway between each of the first and second sidewalls, the respective mounting passageway of each mounting member extending entirely through the mounting member including through the first and second open ends of the mounting member, with each passageway extending generally perpendicular to the front edge of the spatula body.

6. The spatula according to claim 5 wherein each of the mounting members is a tab receiving member and the mounting member has a width and a length and the access opening is substantially coextensive with the width and length of the mounting member.

7. The spatula according to claim 6 wherein the tab receiving members each includes a bottom between the first and second sidewalls, the bottom of the mounting member having a flat top surface, and the sidewalls of the mounting member extend along a line that is generally perpendicular to the second end of the body and the access opening is substantially coextensive with the bottom of the tab receiving member.

8. The spatula according to claim 1 wherein the spatula includes a blade mounted at the second end of the body, the blade including a front end and a rear end, the rear end of the blade mounted in the mounting member to secure the blade to the body.

9. The spatula according to claim 8 wherein the blade includes a sharp front end, and the rear end of the blade has a replacement leading end for insertion through the first open end of the mounting member and through the second open end of the mounting member.

10. The spatula according to claim 9 wherein the blade includes a front section and an intermediate section, and a step joining the front section to the intermediate section, at least one tab extending from the intermediate section of the blade, the tab having a rear end providing the replacement leading end and the replacement leading end is slidably mounted into the mounting member.

11. The spatula according to claim 10 wherein the second open end of the mounting member is a rear open end and the mounting member has first and second sidewalls each extending between the first and second open ends, the blade including a front section and an intermediate section with a step joining the front section to the intermediate section and the blade having a tab extending from the intermediate section, the tab having a rear end providing the replacement leading end, and the replacement leading end is slidably mounted between the first and second sidewalls of the mounting member and through the open first end and through the rear open end of the mounting member in a force fit, the tab replacement leading end extending rearward of the open rear end of the mounting member when the blade is secured to the spatula body with the tab contacting the outer bottom surface of the body rearward of the rear open end of the mounting member and the tab contacting the first and second sidewalls of the mounting member.

12. The spatula according to claim 11 wherein the tab has an upwardly concave upper surface, the concave upper surface of the tab contacting the bottom of the surface of the body rearward of the mounting member.

13. The spatula according to claim 12 wherein the tab acts as a spring to bias the tab against the mounting member.

14. The spatula according to claim 13 wherein the tab includes a lug and the mounting member includes a recess, the lug positioned in the recess to secure the blade to the body, and the tab biases the lug towards the recess.

15. The spatula according to claim 3 further comprising:

a blade mounted to the body, the blade having a sharp front end and a rear end, a first tab and a second tab, each tab extending from the rear end of the blade, a replacement leading end on each of the tabs, the second tab having a replacement leading end that is larger than the replacement leading end of the first tab, the replacement leading end of the second tab being insertable in the open first end of the second mounting member, but too large to permit insertion in the open first end of the first mounting member, and the blade is mounted to the body by insertion of the first tab into the first mounting member and insertion of the second tab in the second mounting member.

16. The spatula according to claim 15 wherein the blade includes a front section that extends forward from the second end of the body, the front section including a hole for securing the blade during insertion and removal of the blade to the body, and the replacement leading end of the tab includes a chamfer.

17. A spatula comprising:

a spatula body having a top working surface and a bottom surface, the spatula body also including a first end and a second end opposite to the first end;

a handle mounted to the first end of the spatula body;

a first mounting member depending from the spatula body proximate the second end of the spatula body, the mounting member having an interior for receiving a mounting portion of a spatula blade;

the interior of the mounting member having an open first end proximate to and facing the second end of the spatula body and the interior of the mounting member having a second open end opposed to the first open end;

a second mounting member laterally spaced from the first mounting member; and a blade mounted to the spatula body, the blade having a sharp front end and a rear end, a first tab and a second tab, each tab extending from the rear end of the blade, a replacement leading end on each of the tabs, the second tab having a replacement leading end that is larger than the replacement leading end of the first tab, the replacement leading end of the second tab being insertable in the open first end of the second mounting member, but too large to permit insertion in the open first end of the first mounting member, and the blade being mounted to the body by insertion of the first tab into the first mounting member and insertion of the second tab into the second mounting member.

18. The spatula according to claim 17 wherein the blade includes a front section that extends forward from the second end of the body, the front section including a hole for securing the blade during insertion and removal of the blade to the body, and the replacement leading end of the tab includes a chamfer.

* * * * *